United States Patent
Violet

(10) Patent No.: US 10,823,174 B2
(45) Date of Patent: Nov. 3, 2020

(54) PLANETARY GEAR DEVICE WITH AN OIL SUPPLY APPLIANCE, GAS TURBINE ENGINE WITH A PLANETARY GEAR DEVICE AND METHOD FOR MANUFACTURING A VANE PUMP

(71) Applicant: Rolls-Royce Deutschland Ltd & Co KG, Blankenfelde-Mahlow (DE)

(72) Inventor: Jakob Violet, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 16/365,134

(22) Filed: Mar. 26, 2019

(65) Prior Publication Data

US 2019/0301466 A1    Oct. 3, 2019

(30) Foreign Application Priority Data

Mar. 28, 2018   (DE) .................. 10 2018 107 494

(51) Int. Cl.
| | |
|---|---|
| F04D 1/12 | (2006.01) |
| F01D 25/20 | (2006.01) |
| F02C 7/06 | (2006.01) |
| F02C 7/32 | (2006.01) |
| F02C 3/113 | (2006.01) |
| F16C 33/66 | (2006.01) |
| F16H 57/04 | (2010.01) |
| B33Y 80/00 | (2015.01) |

(52) U.S. Cl.
CPC .............. *F04D 1/12* (2013.01); *F01D 25/20* (2013.01); *F02C 3/113* (2013.01); *F02C 7/06* (2013.01);
(Continued)

(58) Field of Classification Search
CPC .. F04D 1/12; F01D 25/20; F02C 3/113; F02C 7/06; F02C 7/32; F16C 33/6677; F16H 57/0424; B33Y 80/00
(Continued)

(56) References Cited

U.S. PATENT DOCUMENTS 5,106,209 A * 4/1992 Atkinson ................ F16C 33/60
                                                              384/462
6,409,464 B1    6/2002 Fisher et al.
(Continued)

FOREIGN PATENT DOCUMENTS

DE    102014117840 A1    6/2016
DE    102014117841 A1    6/2016
(Continued)

OTHER PUBLICATIONS

German Search Report dated Nov. 29, 2018 for counerpart German Patent Application No. 10 2018 107 494.8.

*Primary Examiner* — Leslie A Nicholson, III
(74) *Attorney, Agent, or Firm* — Shuttleworth & Ingersoll, PLC; Timothy J. Klima

(57) ABSTRACT

A planetary gearbox device, a gas turbine engine with a planetary gearbox device, and a method for producing a scoop pump. The planetary gearbox device includes an oil supply appliance, wherein the oil supply appliance has a ring-shaped scoop pump that is connected to the rotatable shaft of the planetary gearbox device and an oil supply fixedly arranged at the housing and by which oil is supplied to the scoop pump. The scoop pump has multiple blades that extend in a circumferentially arranged manner and extend from a radially outer area in the direction of a radially inner area. The blades delimit grooves extending in the circumferential direction in the radial direction and respectively form a groove base of the grooves. The oil is conducted from the oil supply to outlets via which oil is conducted out of the scoop pump in the radial direction outwards.

11 Claims, 5 Drawing Sheets

(52) U.S. Cl.
CPC ............ *F02C 7/32* (2013.01); *F16C 33/6677* (2013.01); *F16H 57/0424* (2013.01); *B33Y 80/00* (2014.12)

(58) Field of Classification Search
USPC .......................................................... 475/72
See application file for complete search history.

(56) References Cited

U.S. PATENT DOCUMENTS

| | | | | |
|---|---|---|---|---|
| 8,464,835 | B2* | 6/2013 | Munson | F01D 25/16 |
| | | | | 184/6.11 |
| 8,517,612 | B2* | 8/2013 | Metzger | F16C 33/583 |
| | | | | 384/475 |
| 9,441,541 | B2* | 9/2016 | Wotzak | F01D 25/18 |
| 10,100,918 | B2* | 10/2018 | Venter | F16H 57/025 |
| 10,113,429 | B2* | 10/2018 | McDonagh | F01D 5/085 |
| 2016/0160993 | A1 | 6/2016 | Venter | |
| 2016/0160994 | A1 | 6/2016 | Venter | |
| 2016/0273386 | A1 | 9/2016 | Sheridan et al. | |
| 2016/0319699 | A1 | 11/2016 | Colebrooke | |
| 2018/0142733 | A1 | 5/2018 | Venter | |
| 2018/0306293 | A1 | 10/2018 | Uhkoetter | |

FOREIGN PATENT DOCUMENTS

| | | |
|---|---|---|
| DE | 102017121739 | 9/2017 |
| DE | 102016122583 A1 | 5/2018 |
| DE | 102017108333 A1 | 10/2018 |

\* cited by examiner

PLANETARY GEAR DEVICE WITH AN OIL SUPPLY APPLIANCE, GAS TURBINE ENGINE WITH A PLANETARY GEAR DEVICE AND METHOD FOR MANUFACTURING A VANE PUMP

This application claims priority to German Patent Application DE102018107494.8 filed Mar. 28, 2018, the entirety of which is incorporated by reference herein.

The present disclosure relates to a planetary gearbox device with an oil supply appliance. Further, the present disclosure relates to a gas turbine engine with a planetary gearbox device, as well as to a method for producing a scoop pump.

Known from practice are gas turbine engines in which a fan is connected to a low-pressure turbine by means of a planetary gearbox. The planetary gearbox is embodied with a stationary ring gear and a rotating planetary carrier. To supply bearings and tooth meshings of the planetary gearbox, these are supplied with oil. In that process, oil is supplied to a rotatable shaft of the planetary gearbox via an oil supply that is arranged at a structural component which is fixedly arranged at the housing, and is conducted further to the bearings and tooth meshings.

From DE 10 2014 117 841 A1, it is known to seal off a transfer area between a structural component that is fixedly arranged at the housing and a rotatable shaft against an environment by means of a sealing appliance. The sealing appliance is arranged in the area of an interface between the torque-proof structural component and the rotatable shaft. Here, the sealing appliance is embodied with a threaded area.

However, here a problem is posed by deflections and tiltings of central axes of the torque-proof structural component and the rotatable shaft with respect to each other as they occur during operation. These can lead to undesired leakage in the area of the sealing appliance. To avoid this, elaborate flexible suspensions may become necessary. In addition to that, the sealing appliance is prone to wear.

From the unpublished DE 10 2017 108 333.2 of the applicant a solution is known in which oil can be introduced into a conduit area in a contact-free manner in the axial direction via an oil nozzle. The conduit area is fixedly connected to a rotatably mounted shaft of the planetary gearbox. Arranged inside the conduit area is a pump which is embodied with an impeller and via which oil can be conveyed to loads in the radial direction outwards.

Further, from the unpublished DE 10 2017 121 739.8 of the applicant an oil distribution system is known. Via an oil nozzle that is arranged in a torque-proof manner, oil can be introduced into an opening of a rotatably embodied area in the radial direction outwards and in a contact-free manner. The area has a collecting area that is embodied with an accelerating device that is fixedly attached to the area. Via the accelerating device, a flow that is substantially oriented outwards in the radial direction can be applied to the oil in the collecting area.

Such oil supply systems have large dimensions in particular in the radial direction, and are thus characterized by a high use of material as well as a high weight.

Further, from U.S. Pat. No. 6,409,464 B1 a lubrication system of a gas turbine engine is known. The lubrication system conveys oil to a bearing through a plurality of circumferential and radial grooves.

The present disclosure is based on the objective of providing a planetary gearbox device that has low structural component weight and a constructionally simple structure, and that is characterized by low wear. Further, a gas turbine engine with such a planetary gearbox device is to be provided. In addition, a method for the simple manufacture of a scoop pump is to be provided.

According to a first aspect a planetary gearbox device with an oil supply appliance via which the areas of the planetary gearbox device can be impinged with oil is provided. The oil supply appliance has a ring-shaped scoop pump that is connected to the rotatable shaft of the planetary gearbox device, and an oil supply that is fixedly arranged at the housing. Via the oil supply, oil can be supplied to the scoop pump. The scoop pump has multiple circumferentially distributed blades that extend in the circumferential direction and extend from a radially outer area in the direction of a radially inner area. The blades delimit grooves that extend in the circumferential direction in the radial direction and form a groove base of the grooves, respectively. The grooves are embodied to be open radially inwards in certain areas and radially outwards in other areas. The oil can be conducted by the oil supply through the grooves to deflection areas of the scoop pump, and can be deflected through the deflection areas preferably in the axial direction of the scoop pump into the direction of channel areas. The channel areas each have at least one outlet, respectively, via which oil can be conducted from the scoop pump in the radial direction outwards. The outlets are respectively in operative connection with an oil passage which is arranged in the rotating shaft and via which the areas can be impinged with oil.

The scoop pump is characterized by small structural component dimensions in the radial direction of the planetary gearbox device. In this manner, it is achieved that the planetary gearbox device can be embodied with a low structural component weight and in a cost-effective manner. The scoop pump additionally represents a robust appliance by means of which a sufficient amount of oil can be provided even under unfavorable framework conditions. Among other reasons, this is due to the fact that an oil supply to consumers of the planetary gearbox device takes place in a non-contact manner, and that no elaborate sealing appliances which are prone to wear are required for this purpose. Thus, the planetary gearbox device is characterized by low wear.

Through a contact-free introduction of oil into the scoop pump by means of the oil supply, radial deflections of the planetary gearbox device in particular with respect to the housing, as they may for example be caused by unbalanced masses or as a result of blade rupture, do not influence the functionality of the oil supply. In this way, the risk of failure is reduced, and a motor run is particularly reliable. From the scoop pump, which is also referred to as a radial scoop pump, oil is conducted outwards through the outlets and via the oil passages to the loads. Here, the oil is conveyed outwards due to the centrifugal force that acts during operation of the scoop pump as the scoop pump rotates with the rotational speed of the shaft. An oil pressure that is built up in this process is the higher the longer the path of the oil through the oil passages in the radial direction outwards.

According to a further aspect of the disclosure, at least one channel area extends at least in certain areas substantially in the axial direction of the scoop pump. If at least one channel area, in particular all channel areas, extend(s) in the axial direction of the planetary gearbox device, the scoop pump can be embodied with a smaller installation space in the radial direction, and the oil can be conducted to the desired area of the planetary gearbox device in a simple manner. However, an arrangement that is inclined with respect to the axial direction or a curved embodiment of the channel areas are also possible.

The oil supply can have multiple oil nozzles, which may for example be arranged to be evenly distributed about the circumference of the scoop pump. In this manner, a continuous oil supply can be ensured.

Here, in order to supply oil in a substantially radial direction of the scoop pump into the scoop pump, at least one oil nozzle can be arranged with an orientation that is substantially aligned in the radial direction of the planetary gearbox device with respect to the scoop pump, wherein the oil nozzle is in particular embodied for supplying oil in the radial direction from the outside in. In that case, the scoop pump can be arranged on a small diameter area and can correspondingly be light. However, it can also be provided that the oil nozzle is embodied for supplying oil into the scoop pump in the radial direction from the inside out, wherein in that case the oil nozzle is arranged radially inside the scoop pump.

According to a further aspect of the disclosure, a supply appliance of the oil encloses an angle of between 0° and 90° with the radial direction of the scoop pump, starting from the oil nozzle to the scoop pump. In this manner, an effective supply of oil can be achieved. Here, the oil nozzle can in particular be embodied in such a manner that, from the oil nozzle to the scoop pump, the supply appliance of the oil encloses the angle of between 0° and 90° with the radial direction of the planetary gearbox device in the circumferential direction of the scoop pump. Here, the oil nozzle can be embodied in such a manner that oil can be introduced into the scoop pump counter to a rotational direction of the shaft. However, the oil nozzle can also be embodied in such a manner that oil can be supplied to the scoop pump in the rotational direction of the shaft.

The oil supply appliance can also be embodied as an oil supply ring through which oil can be introduced into the scoop pump via the entire circumference or only via a partial area of the circumference.

Further, it can be provided that the scoop pump is embodied in one, two or in multiple pieces. Here, the scoop pump can be made of a solid material or of a cast structural component.

The rotatable shaft can be a planetary carrier, a ring gear, a planetary gear, or a sun gear of the planetary gearbox device. An anti-rotation device can be provided in order to prevent any twisting of the scoop pump with respect to the planetary carrier, the ring gear, the planetary gear, or the sun gear.

It can be provided that each oil passage is assigned to a load of the planetary gearbox. In this manner, it can be ensured that a desired amount of oil can be supplied to each load in a controlled manner.

Preferably, the grooves of the scoop pump form the deflection areas, and for this purpose have a geometry that is embodied for deflecting the oil that is conducted into the grooves in the direction of the channel areas.

What is proposed according to another aspect of the invention is a method for producing a scoop pump as it has been described in more detail above, wherein the scoop pump is manufactured in a 3D printing method or a so-called additive layer manufacturing method. With a 3D printing method, such a scoop pump can be produced in a particularly simple manner in a one-piece embodiment.

What is proposed according to a further aspect is a gas turbine engine for an aircraft, comprising the following:

an engine core that comprises a turbine, a compressor, and a core shaft that connects the turbine to the compressor;

a fan that is positioned upstream of the engine core, wherein the fan comprises multiple fan blades; and a gearbox that receives an input from the core shaft and outputs drive for the fan for driving the fan with a lower rotational speed than the core shaft, wherein the gearbox is embodied as a planetary gearbox device as described in more detail above.

The input to the gearbox may be directly from the core shaft, or indirectly from the core shaft, for example by means of a spur shaft and/or gear. The core shaft may be rigidly connected to the turbine and the compressor, such that the turbine and the compressor rotate at the same rotational speed (with the fan rotating at a lower rotational speed). Here, the gearbox can be embodied as a planetary gearbox as it is described in more detail above.

The gas turbine engine as disclosed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by one or multiple shafts, for example the first and/or second shaft in the above example.

In a gas turbine engine as disclosed herein, a combustion space may be provided axially downstream of the fan and the compressor (or the compressors). For example, the combustion space may be located directly downstream of the second compressor (for example at the exit thereof), if a second compressor is provided. By way of further example, the flow at the exit of the combustor may be provided to the inlet of the second turbine, if a second turbine is provided. The combustion space may be provided upstream of the turbine(s).

The or each compressor (for example the first compressor and the second compressor according to the above description) may comprise any number of stages, for example multiple stages. Each stage may comprise a row of rotor blades and a row of stator vanes, which may be variable stator vanes (i.e. in that their angle of incidence may be variable). The row of rotor blades and the row of stator vanes may be axially offset with respect to each other.

The or each turbine (for example the first turbine and second turbine according to the above description) may comprise any number of stages, for example multiple stages. Each stage may comprise a row of rotor blades and a row of stator vanes. The row of rotor blades and the row of stator vanes may be axially offset with respect to each other.

Each fan blade may be defined with a radial span width extending from a root (or hub) at a radially inner gas-washed location, or from a 0% span position to a tip with a 100% span width. Here, the ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in a closed range bounded by any two values in the previous sentence (i.e., the values may represent upper or lower bounds). These ratios may commonly be referred to as the hub-to-tip ratio. The radius at the hub and the radius at the tip may both be measured at the leading (or the axially forwardmost) edge of the blade. The hub-to-tip ratio refers, of course, to the gas-washed portion of the fan blade, i.e. the portion that is located radially outside any platform.

The radius of the fan may be measured between the engine centerline and the tip of a fan blade at its leading edge. The fan diameter (which may simply be twice the radius of the fan) may be greater than (or on the order of) any of: 250 cm (about 100 inches), 260 cm, 270 cm (about 105 inches), 280 cm (about 110 inches), 290 cm (about 115 inches), 300 cm (about 120 inches), 310 cm, 320 cm (about 125 inches), 330 cm (about 130 inches), 340 cm (about 135 inches), 350 cm, 360 cm (about 140 inches), 370 cm (about 145 inches), 380 (about 150 inches) cm or 390 cm (about 155 inches). The fan diameter may be in a closed range bounded by any two of the values in the previous sentence (i.e. the values may represent upper or lower bounds).

The rotational speed of the fan may vary during use. Generally, the rotational speed is lower for fans with a higher diameter. Purely by way of non-limiting example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range from 1700 rpm to 2500 rpm, for example in the range of between 1800 rpm to 2300 rpm, for example in the range of between 1900 rpm to 2100 rpm. Purely by way of further non-limitative example, the rotational speed of the fan at cruise conditions for an engine having a fan diameter in the range of between 320 cm to 380 cm may be in the range of between 1200 rpm to 2000 rpm, for example in the range of between 1300 rpm to 1800 rpm, for example in the range of between 1400 rpm to 1600 rpm.

In use of the gas turbine engine, the fan (with the associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as the fan tip radius at the leading edge multiplied by the angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (with all units in this paragraph being $Jkg^{-1} K^{-1}/(ms^{-1})^2$). The fan tip loading may be in a closed range bounded by any two of the values in the previous sentence (i.e. the values may represent upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements, the bypass ratio may be greater than (or on the order of): 10, 10.5, 11, 11.5, 12, 12.5, 13, 13.5, 14, 14.5, 15, 15.5, 16, 16.5, or 17. The bypass ratio may be in a closed range bounded by any two of the values in the previous sentence (i.e. the values may represent upper or lower bounds). The bypass duct may be substantially annular. The bypass duct may be radially outside the core engine. The radially outer surface of the bypass duct may be defined by a nacelle and/or a fan housing.

The overall pressure ratio of a gas turbine engine disclosed herein may be defined as the ratio of the stagnation pressure upstream of the fan to the stagnation pressure at the exit of the highest-pressure compressor (before entry into the combustion space). By way of non-limitative example, the overall pressure ratio of a gas turbine engine as disclosed herein at cruising speed may be greater than (or on the order of): 35, 40, 45, 50, 55, 60, 65, 70, 75. The overall pressure ratio may be in a closed range bounded by any two of the values in the previous sentence (i.e. the values may represent upper or lower bounds).

Specific thrust of a gas turbine engine may be defined as the net thrust of the gas turbine engine divided by the total mass flow through the engine. At cruise conditions, the specific thrust of an engine as disclosed herein may be less than (or on the order of): 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in a closed range bounded by any two of the values in the previous sentence (i.e. the values may represent upper or lower bounds). Such gas turbine engines may be particularly efficient as compared to conventional gas turbine engines.

A gas turbine engine as disclosed herein may have any desired maximum thrust. Purely by way of non-limitative example, a gas turbine as disclosed herein may be capable of producing a maximum thrust of at least (or on the order of): 160 kN, 170 kN, 180 kN, 190 kN, 200 kN, 250 kN, 300 kN, 350 kN, 400 kN, 450 kN, 500 kN, or 550 kN. The maximum thrust may be in a closed range bounded by any two of the values in the previous sentence (i.e. the values may represent upper or lower bounds). The thrust referred to above may be the maximum net thrust at standard atmospheric conditions at sea level plus 15 deg C. (ambient pressure 101.3 kPa, temperature 30 deg C.), with the engine being static.

In use, the temperature of the flow at the entry to the high-pressure turbine may be particularly high. This temperature, which may be referred to as TET, may be measured at the exit to the combustion space, for example immediately upstream of the first turbine vane, which itself may be referred to as a nozzle guide vane. At cruising speed, the TET may be at least (or on the order of): 1400 K, 1450 K, 1500 K, 1550 K, 1600 K or 1650 K. The TET at cruising speed may be in a closed range bounded by any two of the values in the previous sentence (i.e. the values may represent upper or lower bounds). The maximum TET in use of the engine may be, for example, at least (or on the order of): 1700 K, 1750 K, 1800 K, 1850 K, 1900 K, 1950 K or 2000 K. The maximum TET may be in a closed range bounded by any two of the values in the previous sentence (i.e. the values may represent upper or lower bounds). The maximum TET may occur, for example, at a high thrust condition, for example at a maximum take-off (MTO) condition.

A fan blade and/or aerofoil portion of a fan blade as described herein may be manufactured from any suitable material or combination of materials. For example, at least a part of the fan blade and/or aerofoil may be manufactured at least in part from a composite, for example a metal matrix composite and/or an organic matrix composite, such as carbon fiber. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions that are manufactured by using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fiber or aluminum based body (such as an aluminum lithium alloy) with a titanium leading edge.

A fan as described herein may comprise a central portion, from which the fan blades may extend, for example in a radial direction. The fan blades may be attached to the central portion in any desired manner. For example, each fan blade may comprise a fixture device which may engage a corresponding slot in the hub (or disc). Purely by way of example, such a fixture device may be present in the form of a dovetail that may be inserted into a corresponding slot in the hub/disc and/or may engage with the same in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines disclosed herein may or may not be provided with a variable area nozzle (VAN). Such a variable area nozzle may allow for the exit area of the bypass duct to be varied during operation. The general principles of the present disclosure may apply to engines with or without a VAN.

The fan of a gas turbine engine as disclosed herein may have any desired number of fan blades, for example 16, 18, 20, or 22 fan blades.

As used herein, cruise conditions may refer to the cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at cruise condition may be any point in the range from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85, or in the range from 0.8 to 0.85. Any single speed within these ranges may be the cruise condition. For some aircrafts, the cruise conditions may be outside these ranges, for example below Mach 0.7 or above Mach 0.9.

Purely by way of example, the cruise conditions may correspond to standard atmospheric conditions at an altitude that is in the range from 10000 m to 15000 m, for example in the range from 10000 m to 12000 m, for example in the range from 10400 m to 11600 m (around 38000 ft), for example in the range from 10500 m to 11500 m, for example in the range from 10600 m to 11400 m, for example in the range from 10700 m (around 35000 ft) to 11300 m, for example in the range from 10800 m to 11200 m, for example in the range from 10900 m to 11100 m, for example on the order of 11000 m. The cruise conditions may correspond to standard atmospheric conditions at any given altitude in these ranges.

Purely by way of example, the cruise conditions may correspond to the following: a forward Mach number of 0.8; a pressure of 23000 Pa; and a temperature of −55 deg C.

As used anywhere herein, "cruise" or "cruise conditions" may refer to the aerodynamic design point. Such an aerodynamic design point (or ADP) may correspond to the conditions (comprising, for example, one or more of the Mach Number, environmental conditions and thrust requirement) in which the fan is designed to operate. This may mean, for example, the conditions at which the fan (or the gas turbine engine) is designed to have optimum efficiency.

During operation, a gas turbine engine as disclosed herein may operate at the cruise conditions defined elsewhere herein. Such cruise conditions may be determined by the cruise conditions (for example the mid-cruise conditions) of an aircraft to which at least one (for example two or four) gas turbine engine may be mounted in order to provide propulsive thrust.

A person skilled in the art will appreciate that, except where mutually exclusive, a feature or parameter described in relation to any one of the above aspects may be applied to any other aspect. Furthermore, except where mutually exclusive, any feature or parameter described herein may be applied to any aspect and/or can be combined with any other feature or parameter described herein.

Now, embodiments will be described by way of example with reference to the Figures; in the Figures.

Figure 1:
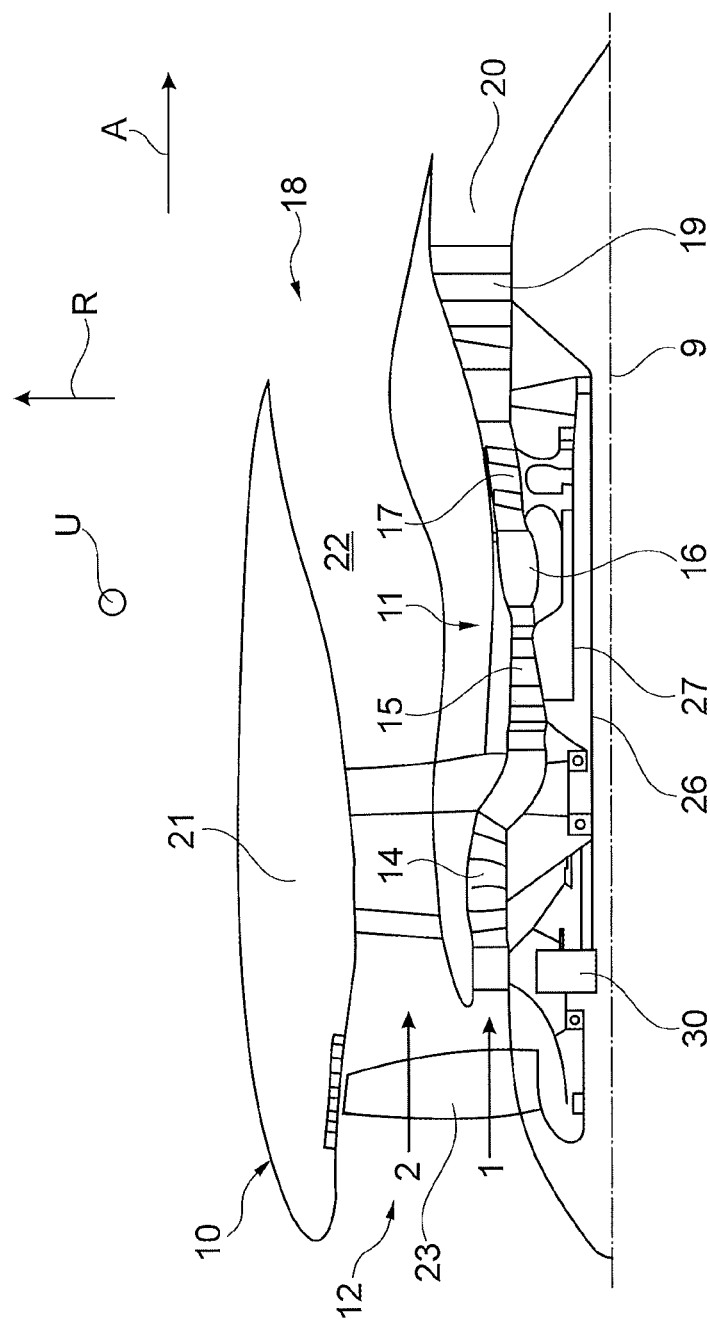
FIG. 1 shows a longitudinal sectional view of a gas turbine engine.

FIG. 1 describes a gas turbine engine 10 having a main rotational axis 9. The engine 10 comprises an air intake 12 and a thrust fan or fan 23 that generates two airflows: a core airflow A and a bypass airflow B. The gas turbine engine 10 comprises a core 11 that receives the core air flow A. The core engine 11 comprises, as viewed in the axial flow direction, a low-pressure compressor 14, a high-pressure compressor 15, combustion device 16, a high-pressure turbine 17, a low-pressure turbine 19, and a core engine exhaust nozzle 20. An engine nacelle 21 surrounds the gas turbine engine 10 and defines the bypass channel 22 and a bypass exhaust nozzle 18. The bypass airflow 2 flows through the bypass channel 22. The fan 23 is attached by means of a shaft 26 and an epicycloidal gearbox 30 at the low-pressure turbine 19 and is driven by the same. Here, the shaft 26 is also referred to as the core shaft.

During operation, the core airflow 1 is accelerated and compressed by the low-pressure compressor 14, and is directed into the high-pressure compressor 15 where further compression takes place. The air that is discharged from the high-pressure compressor 15 in a compressed state is directed into the combustion device 16 where it is mixed with fuel and combusted. The resulting hot combustion products are then propagated through the high-pressure turbine 17 and the low-pressure turbine 19, and thus drive them before they are discharged through the nozzle 20 for providing a certain thrust. The high-pressure turbine 17 drives the high-pressure compressor 15 by means of a suitable connecting shaft 27, which is also referred to as a core shaft. The fan 23 usually provides the greatest portion of the propulsive thrust. The epicycloidal gearbox 30 is a reduction gear.

Figure 2:
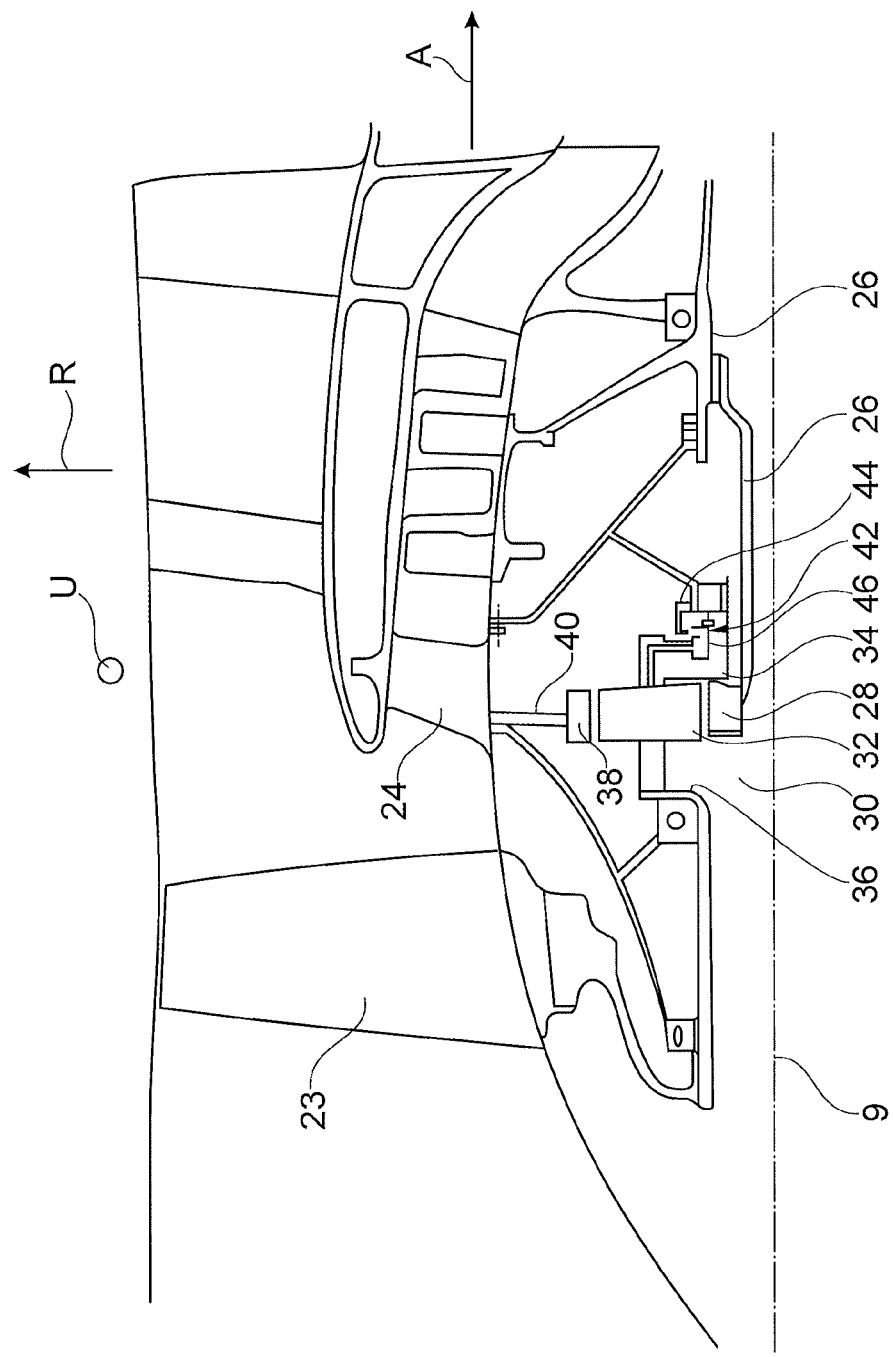
FIG. 2 shows an enlarged partial longitudinal sectional view of an upstream section of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicycloidal gearbox arrangement 30. Located radially outwardly of the sun gear 28 and intermeshing therewith is a plurality of planetary gears 32 that are coupled with each other by a planet carrier 34. The planetary carrier 34 limits the planetary gears 32 to rotating in synchronicity about the sun gear 28, whilst enabling each planet gear 32 on the support elements 29 to rotate about its own axis. Via linkages 36, the planetary carrier 34 is coupled to the fan 23 such that it causes its rotation about the engine axis 9. An outer gear or ring gear 38, which is coupled by means of linkages 40 to a stationary support structure 24, is located radially outside with respect to the planetary gears 32 and intermeshes therewith.

It should be noted that the terms "low pressure turbine" and "low pressure compressor" as used herein may be taken to refer to the turbine stage with the lowest pressure and the compressor stage with the lowest pressure (i.e., not including the fan 23) and/or refer to the turbine and compressor stage that are connected by the interconnecting shaft 26 with the lowest rotational speed in the engine (i.e., not including the gearbox output shaft that drives the fan 23). In some documents, "low pressure turbine" and a "low pressure compressor", which are referred to herein, may alternatively also be known as an "intermediate pressure turbine" and an "intermediate pressure compressor". Where such alternative nomenclature is used, the fan 23 may be referred to as a first or lowest pressure stage.

Figure 3:
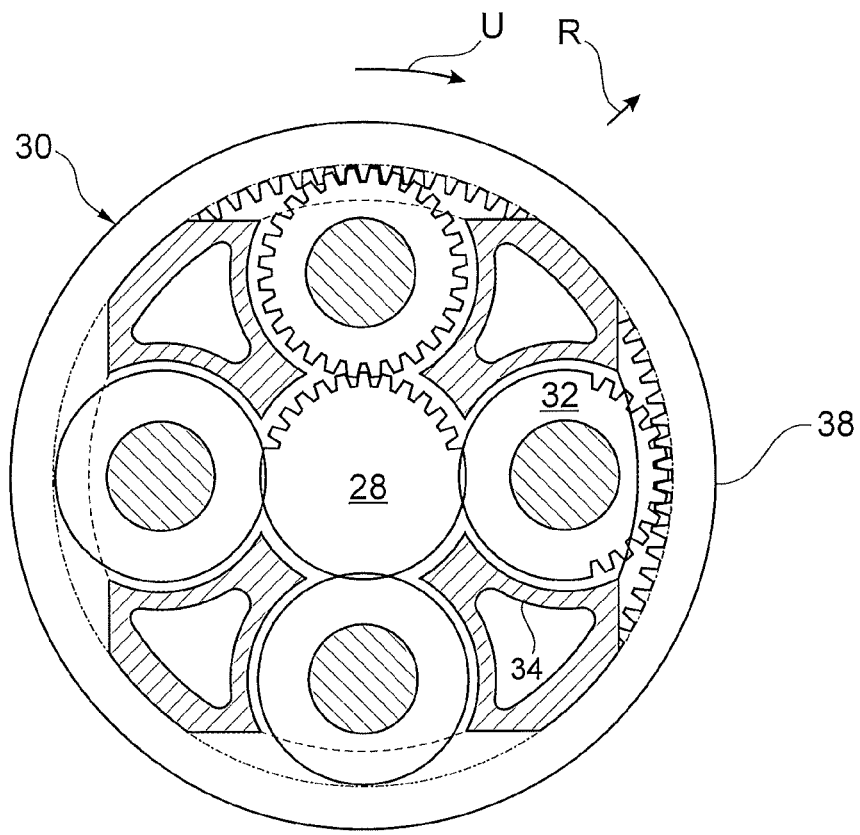
FIG. 3 shows a planetary gearbox device for a gas turbine engine in isolation.

The epicycloidal gearbox 30 is shown in FIG. 3 in more detail by way of example. The sun gear 28, planetary gears 32 and the ring gear 38 respectively have teeth at their circumference to intermesh with the other gears. However, for reasons of clarity only exemplary portions of the teeth are illustrated in FIG. 3. Although four planetary gears 32 are illustrated here, it will be apparent to the person skilled in the art that more or fewer planetary gears 32 may be provided within the scope of the claimed invention. Practical applications of a epicyclic gearbox 30 generally comprise at least three planetary gears 32.

The epicycloidal gearbox 30 shown in FIGS. 2 and 3 by way of example is a planetary gearbox, in which the planetary carrier 34 is coupled by means of linkages 36 to the output shaft, wherein the ring gear 38 is fixedly attached. However, it is possible to use any other kind of epicycloidal gearbox 30. As a further example, the epicycloidal gearbox 30 can be a star arrangement in which the planetary carrier 34 is supported in a fixedly attached manner, wherein the ring gear (or outer gear) 38 is allowed to rotate. In such an arrangement, the fan 23 is driven by the ring gear 38. As a further alternative example, the gearbox 30 can be a differential gear which allows for the ring gear 38 as well as the planetary carrier 34 to rotate.

It is to be understood that the arrangement shown in FIGS. 2 and 3 merely represents an example, and that various alternatives are included in the scope of the present disclosure. Merely as an example, any suitable arrangement for positioning the gearbox 30 in the engine 10 and/or for connecting the gearbox 30 to the engine 10 can be used. As a further example, the connections (e.g. the linkages 36, 40 in the example of FIG. 2) between the gearbox 30 and other parts of the engine 10 (such as e.g. the input shaft 26, the output shaft, and the fixed structure 24) can have a certain degree of stiffness or flexibility. As a further example, any suitable arrangement of the bearings between rotating and stationary parts of the engine (for example between the input and the output shaft of the gearbox and the fixed structures, such as e.g. the gearbox housing) can be used, and the disclosure is not limited to the exemplary arrangement of FIG. 2. For example, it will be obvious for a person skilled in the art that the arrangement of output and support linkages and bearing positions in a star arrangement (described above) of the gearbox 30 would usually differ from those that are shown by way of example in FIG. 2.

Correspondingly, the present disclosure extends to a gas turbine engine with any desired arrangement of gearbox types (for example star arrangements or planetary arrangements), support structures, input and output shaft arrangement, and bearing positions.

Optionally, the gearbox may drive auxiliary and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass channel 22 has its own nozzle which is separate from and arranged radially outside of the engine core nozzle 20. However, this is not to be taken in a limiting manner, and any aspect of the present disclosure may also apply to engines in which the flow through the bypass channel 22 and the flow through the core 11 are intermixed or combined in front of (or upstream) a single nozzle, which may be referred to as a mixed flow nozzle. One or both nozzles may have a fixed or variable area (independently of whether a mixed or a partial flow is present). Although the described example refers to a turbofan engine, the disclosure may for example be used in any kind of gas turbine engine, such as e.g. in an open rotor (in which the fan stage is not surrounded by an engine nacelle), or a turboprop engine.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the view of FIG. 1). The axial direction A, the radial direction R and the circumferential direction U are mutually perpendicular.

Figure 4:
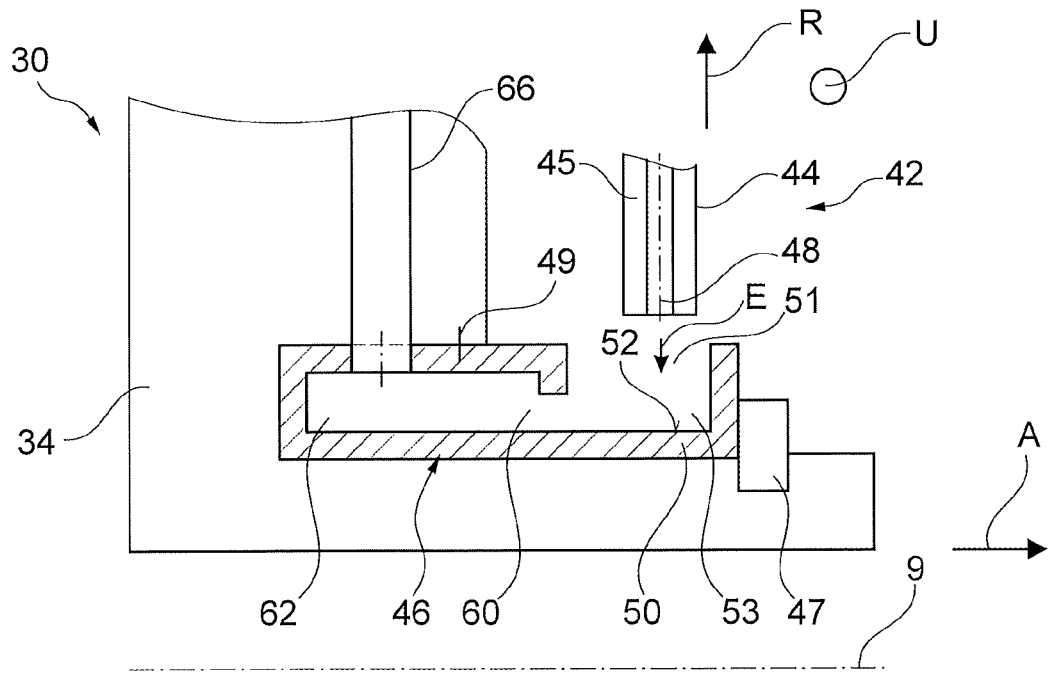
FIG. 4 shows an enlarged view of a section of a partial longitudinal sectional view of a gas turbine engine according to FIG. 2, wherein a scoop pump is shown in more detail.

Further, in FIG. 4 is shown a part of an oil supply appliance 42 that is provided for supplying consumers of the gearbox 30 or the planetary gearbox device. The oil supply appliance 42 is in particular provided for lubricating and/or cooling tooth meshings of the planetary gears 32 with the sun gear 28 or with the ring gear 38 and for cooling and/or lubricating bearings. The bearings can be provided for mounting the planetary gears 32 with respect to the planetary carrier 34.

The oil supply appliance 42 shown in more detail in FIG. 4 is embodied with an oil supply 44 and with a ring-shaped scoop pump 46, wherein the scoop pump 46 is formed in one piece. In the present case, the oil supply 44 has an oil nozzle 45, but in alternative embodiments can also comprise multiple, in particular two, three, four or even more oil nozzles 45 that are arranged in the circumferential direction U. As can be seen in more detail in FIG. 4, in a first arrangement that is indicated by the reference sign 45', the oil nozzle 45 has a central axis 48 that is substantially oriented in the radial direction R of the planetary gearbox device 30. In the first arrangement 45', oil can be supplied inwards in direction of the scoop pump 46 in the substantially radial direction R of the planetary gearbox device 30 by means of the oil nozzle 45.

Figure 5:
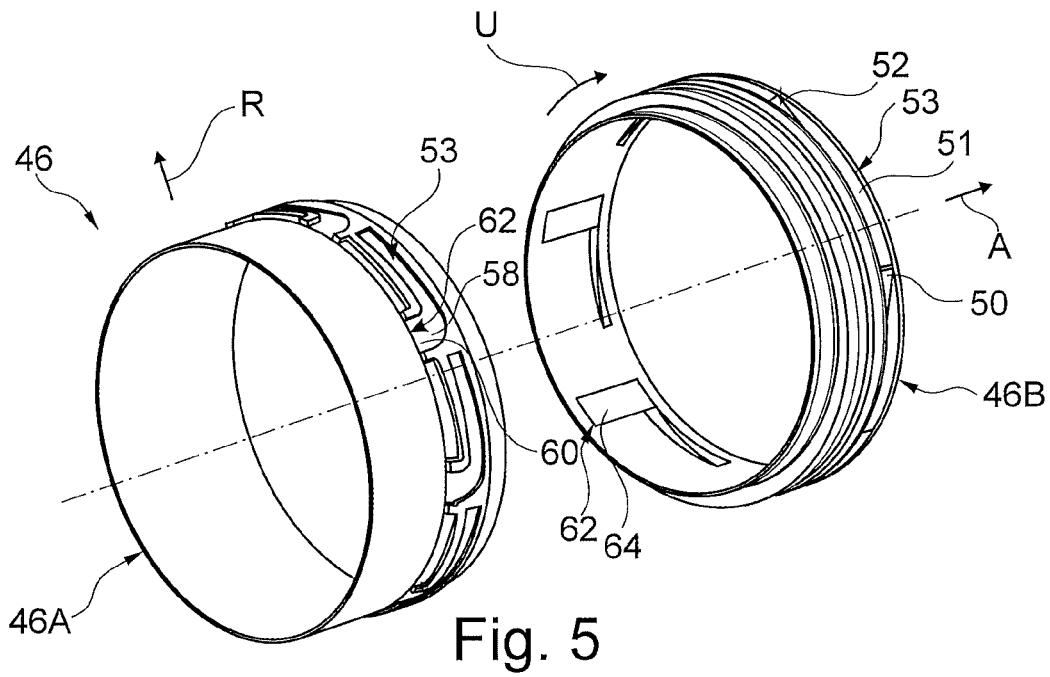
FIG. 5 shows, in isolation, a three-dimensional illustration of a scoop pump that is embodied in two pieces, wherein the two pieces of the scoop pump are shown in a state in which they are not connected to each other.

The scoop pump 46 is embodied in two pieces in the manner shown in FIG. 5, and comprises an inner ring body 46A and an outer ring body 46B operatively connected to the same in a sealing manner. In addition, here the scoop pump 46 is connected—via a press fit provided in the area between the inner ring body 46A and the planetary carrier 34—in a torque-proof manner to the planetary carrier 34 that rotates during operation. To reliably avoid any rotation of the scoop pump 46 with respect to the planetary carrier 34, an additional anti-rotation device is provided, which is for example embodied with a pin 49 schematically shown in FIG. 4. The pin 49 is arranged inside a groove that is provided in the planetary carrier 34. In addition, in the present case an axial securing means with a snap ring 47, or alternatively with a ring nut or the like, is provided to ensure an axial position of the scoop pump 46 with respect to the planetary carrier 34.

For receiving and further conducting the oil that is conducted or sprayed by the oil nozzle 45 in the direction of the scoop pump 46 with a defined impulse, the scoop pump 46 has multiple blades 50 in a first axial edge area 53, which are arranged evenly distributed in the circumferential direction U of the planetary gearbox device 30 or the scoop pump 46. In the present case, four blades 50 are provided corresponding to the number of the planetary gears 32 of the planetary gearbox device 30. The blades 50 each extend from a radially outer area in the direction of a radially inner area of the scoop pump 46.

Figure 7:
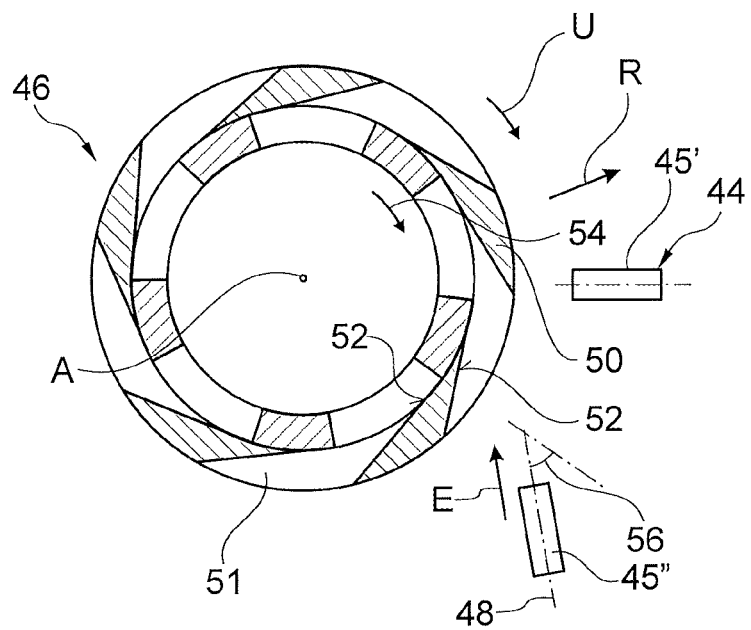
FIG. 7 shows a simplified cross-sectional view of the scoop pump with five blades, corresponding to FIG. 6.

The number of the blades 50 can vary depending on the application case, wherein less blades 50, for example one, two, or three blades 50, as well as more blades 50, for example five, six, seven, eight, or even more blades 50, can be provided. In FIG. 7, the scoop pump 46 is embodied with five blades 50.

Figure 6:
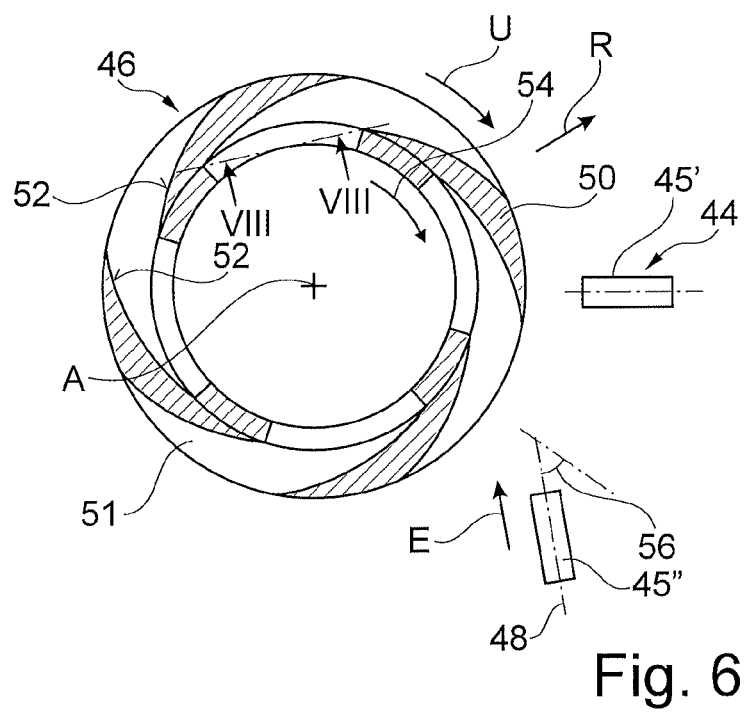
FIG. 6 shows a simplified cross-sectional view of the scoop pump along a section line VI-VI in FIG. 4 with four blades.

As shown in FIG. 6 and FIG. 7, the blades 50 delimit grooves 51 or ducts being partially open to the outside and partially open to the inside and extending in the circumferential direction U in the radial direction R of the planetary gearbox device 30, respectively form a groove base 52 or a bottom surface 52 of the grooves 51. In the present case, a radial distance between the inwardly oriented bottom surfaces 52 or the outwardly oriented bottom surfaces 52 of the grooves 51 of the blades 50 and the main rotational axis 9 respectively increases in the circumferential direction U of the planetary gearbox device 30 and in the rotational direction 54 of the planetary carrier 34.

In a second arrangement of the oil nozzle 45 as indicated by the reference sign 45", in order to optimize the oil reception of the scoop pump 46 and thus increase the efficiency of the blade pump 46, the central axis 48 of the oil nozzle 45 encloses an angle 56 with the radial direction R of the planetary gearbox device 30 in the drawing plane. Here, an introduction direction E of the oil is in particular partially oriented counter to the rotational direction 54 of the planetary carrier 34. In the drawing plane, the angle 56 can take values of between 0° and 90° with respect to the radial direction R of the planetary gearbox device 30, and is in particular in the range of approximately 45°. In the second arrangement 45", the oil nozzle 45 is positioned tangentially with respect to the blades 50 of the scoop pump 46 in the circumferential direction U.

The oil supplied by the oil nozzle 45 is taken along by the blades 50 in the circumferential direction U and is conveyed inwards in the radial direction R of the planetary gearbox device 30 through the grooves 51.

Here, in order to accelerate the oil, there is the possibility of continuously reducing the flow cross section of the grooves 51 in the flow direction of the oil at least in certain sections, starting from the entry of the oil into the grooves 51 towards the exit from the grooves.

In the present case, a deflection area 58 and a channel area 60 is assigned to each groove 51. Here, the deflection areas 58 can be respectively formed by the grooves 51. By means of the deflection areas 58, the oil that is supplied to the grooves 51 is introduced into the respective channel area 60, which in the present case extends in the axial direction A of the planetary gearbox device 30. In the channel areas 60, the oil is conducted from the first axial edge area 53 in the direction of a second axial edge area 62. The channel areas 60 represent channels extending in the axial direction A of the planetary gearbox device 30 and having an in particular constant flow cross section.

In the second axial edge area 62, the channel areas 60 in the radial direction R of the planetary gearbox device 30 have respectively one outlet 64, which may for example may be embodied as a bore. Each outlet 64 acts together with a channel-shaped oil passage 66 that is arranged in the planetary carrier 34 and extends starting from the bore 64 at least partially outwards in the radial direction R. When the planetary carrier 34 rotates, the oil is conveyed outwards due to the acting centrifugal force. The oil passages 66 guide the oil to the desired loads. Here, it can be provided that each oil passage 66 guides oil to a consumer. Alternatively or additionally, it may also be provided that an oil passage 66 conducts oil to multiple consumers, or that oil is conducted via multiple oil passages 66 to one consumer.

Figure 8:
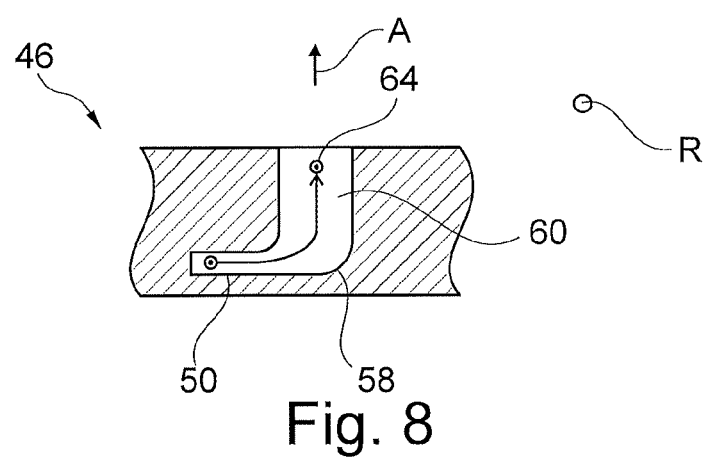
FIG. 8 shows a simplified sectional view of the scoop pump along a sectional line VIII-VIII in FIG. 6.

FIG. 8 shows a simplified sectional view of the scoop pump 46, wherein a flow path of the oil that is supplied to the scoop pump 46 from the first axial edge area 53 to the second axial edge area 62 is illustrated in more detail.

Depending on the design and the requirements, in an alternative embodiment also multiple deflection areas 58 can be combined in one channel area 60 or they may open into a channel area 60 to achieve that the volume flow that is supplied via this channel area 60 to a loads or consumers is particularly large.

It is to be understood that the invention is not limited to the above-described embodiments, and that various modifications and improvements can be carried out without departing from the described concepts. Any of the features can be used either separately or in combination with any of the other features, so long as they are not mutually exclusive, and the disclosure extends to all combinations and sub-combinations of one or multiple features described herein, and includes the same.

PARTS LIST 1 core airflow
2 bypass airflow
9 main rotational axis
10 gas turbine engine
11 core
12 air intake
14 low-pressure compressor
15 high-pressure compressor
16 combustion appliance
17 high-pressure turbine
18 bypass thrust nozzle
19 low-pressure turbine
20 core thrust nozzle
21 engine nacelle
22 bypass channel
23 thrust fan
24 support structure
26 shaft, connecting shaft
27 connecting shaft
28 sun gear
29 carrier element
30 gearbox, planetary gearbox
32 planetary gear
34 planetary carrier
36 linkage
38 ring gear
40 linkage
42 oil supply appliance
44 oil supply
45 oil nozzle
45' first arrangement of the oil nozzle
45" second arrangement of the oil nozzle
46 scoop pump
46A inner ring body of the scoop pump
46B outer ring body of the scoop pump
47 snap ring
48 central axis of the oil nozzle
49 pin
50 blade
51 groove
52 groove base
53 first axial edge area of the scoop pump
54 rotational direction of the planetary carrier
56 angle
58 deflection area
60 channel area
62 second axial edge area of the scoop pump
64 outlet; bore
66 oil passage
A axial direction
E introduction direction
R radial direction
U circumferential direction

The invention claimed is:
1. A planetary gearbox device comprising:
   a rotatable shaft including an oil passage arranged in the rotatable shaft;
   a housing;
   an oil supply appliance via which an area of the planetary gearbox device is impinged with oil, wherein the oil supply appliance further comprises:
      a ring-shaped scoop pump that is connected to the rotatable shaft, wherein the ring-shaped scoop pump includes:
         a radially outer area with respect to an axis of rotation of the rotatable shaft;
         a radially inner area;
         a plurality of blades that extend in a circumferential direction with respect to the axis of rotation and are circumferentially arranged, and wherein the plurality of blades extend from the radially outer area in a direction of the radially inner area; and
         a plurality of grooves delimited by and located between the plurality of blades, wherein the plurality of grooves extend in the circumferential direction and in a radial direction and respectively form a plurality of groove bases of the plurality of grooves, and wherein the plurality of grooves are open radially to an inside and wherein the plurality of grooves are open radially to an outside;
      an oil supply fixedly arranged at the housing, via which oil is supplied to the ring-shaped scoop pump, wherein the old supply includes:
         a nozzle with a defined impulse flow arranged at a radial distance from the ring-shaped scoop pump;
         wherein oil is sprayed with the defined impulse flow from the nozzle in a direction of the ring-shaped scoop pump to conduct oil to the ring-shaped scoop pump in a contact-free manner;
      a deflection area;
      a channel area including an outlet;
      an oil passage, wherein oil is guided from the oil supply through the plurality of grooves to the deflection area of the ring-shaped scoop pump;
      wherein oil is deflected via the deflection area in a direction of the channel area and conducted in the radial direction outwards from the ring-shaped scoop pump via the outlet of the channel area; and
      wherein the outlet is in operative connection with the oil passage that is arranged in the rotatable shaft and via which the area of the planetary gearbox device is impinged with oil.

2. The planetary gearbox device according to claim 1, wherein the channel area extends substantially in an axial direction with respect to the axis of rotation of the rotatable shaft.

3. The planetary gearbox device according to claim 1, wherein the oil supply includes a plurality of nozzles.

4. The planetary gearbox device according to claim 3, wherein at least one nozzle of the plurality of nozzles supplies oil in the radial direction to the ring-shaped scoop pump.

5. The planetary gearbox device according to claim 4, wherein the oil supply appliance is located at an angle of between 0° and 90° with the radial direction of the ring-shaped scoop pump, starting from the nozzle to the ring-shaped scoop pump.

6. The planetary gearbox device according to claim 1, wherein the oil supply appliance is an oil supply ring.

7. The planetary gearbox device according to claim 1, wherein the ring-shaped scoop pump is in one chosen from one piece, two pieces, and greater than two pieces.

8. The planetary gearbox device according to claim 1, wherein the rotatable shaft is one chosen from a planetary carrier, a ring gear, a planetary gear and a sun gear of the planetary gearbox device.

9. A gas turbine engine for an aircraft, comprising:
the planetary gearbox device according to claim 1;
an engine core comprising a turbine, a compressor and a core shaft, wherein the core shaft connects the turbine to the compressor;
a fan that is positioned upstream of the engine core, wherein the fan comprises multiple fan blades; and
wherein the planetary gearbox device receives an input from the core shaft and the planetary gearbox device provides an output drive for the fan for driving the fan with a lower rotational speed than the core shaft.

10. The gas turbine engine according to claim 9, wherein the turbine is a first turbine, the compressor is a first compressor, and the core shaft is a first core shaft;
wherein the engine core further comprises a second turbine, a second compressor, and a second core shaft, wherein the core shaft connects the second turbine to the second compressor; and
wherein the second turbine, the second compressor and the second core shaft are arranged in such a manner that they rotate with a higher rotational speed than the first core shaft.

11. The planetary gearbox device according to claim 1, wherein the ring-shaped scoop pump is a 3D printed ring-shaped scoop pump.

\* \* \* \* \*